(12) United States Patent
Sanford et al.

(10) Patent No.: US 8,342,228 B2
(45) Date of Patent: Jan. 1, 2013

(54) SYSTEMS AND METHODS FOR INSERT-MOLDING

(75) Inventors: Emery Sanford, San Francisco, CA (US); Ed Holman, Tracy, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/624,886

(22) Filed: Nov. 24, 2009

(65) Prior Publication Data

US 2010/0147482 A1    Jun. 17, 2010

Related U.S. Application Data

(60) Provisional application No. 61/117,423, filed on Nov. 24, 2008.

(51) Int. Cl.
*B22C 9/22* (2006.01)
*B22D 19/00* (2006.01)

(52) U.S. Cl. ........... 164/91; 164/76.1; 164/98; 164/131; 264/250; 264/259; 264/273; 264/279.1

(58) Field of Classification Search ................. 164/76.1, 164/91, 98, 113, 131; 264/239, 250, 259, 264/272, 272.11, 279.1, 273
See application file for complete search history.

(56) References Cited

U.S. PATENT DOCUMENTS

| | | | |
|---|---|---|---|
| 4,584,755 A | | 4/1986 | Lundquist |
| 4,614,630 A | * | 9/1986 | Pluim, Jr. ............ 264/219 |
| 5,117,894 A | * | 6/1992 | Katahira ............ 164/113 |
| 6,693,239 B2 | | 2/2004 | Myers et al. |
| 7,025,740 B2 | * | 4/2006 | Ahmed ............ 604/9 |
| 7,406,778 B2 | | 8/2008 | Lee et al. |
| 2008/0298927 A1 | * | 12/2008 | Chen et al. ............ 411/495 |
| 2009/0040631 A1 | * | 2/2009 | Wong ............ 359/811 |
| 2009/0280347 A1 | * | 11/2009 | Yu ............ 428/545 |

* cited by examiner

*Primary Examiner* — Devang R Patel
(74) *Attorney, Agent, or Firm* — Womble Carlyle Sandridge & Rice LLP

(57) ABSTRACT

The present invention includes systems and methods for insert-molding. In some embodiments, a hook can be formed in a metal part by passing die-steel of a die-cast mold through the metal part during a die-casting process. This may, however, result in a hole in the metal part that is beneath the hook area. When plastic material is insert-molded over the metal part, the plastic material may flow through the hole and into the metal part. Accordingly, in some embodiments the plastic material can be prevented from flowing through the hole during the insert-molding. As one example, a tape material can be coupled over the hole. As another example, a wedge can be press-fit into the hole. As yet another example, a plug can be inserted into the hole.

18 Claims, 12 Drawing Sheets

SYSTEMS AND METHODS FOR INSERT-MOLDING

CROSS-REFERENCE TO RELATED APPLICATIONS

This application claims the benefit of U.S. Provisional Patent Application No. 61/117,423, filed on Nov. 24, 2008, which is hereby incorporated by reference herein in its entirety.

FIELD OF THE DISCLOSURE

This relates to systems and methods for insert-molding. In particular, this relates to systems and methods for insert-molding components having apertures through which it is desirable not to have material flow.

BACKGROUND OF THE DISCLOSURE

Metal parts may often be formed through, for example, techniques such as die-casting. To perform die-casting, molten metal can be forced under high pressure into a die-cast mold of a desired pattern. The molten metal may then be allowed to cool and harden into the metal part. After the molten metal has cooled, the die-cast mold can be "opened" or otherwise removed from around the metal part.

In some embodiments, a metal part including a hook feature can be created via die-cast molding. However, generally a hook may not be created directly through die-cast molding. For example, since the pieces of the die-cast mold can be removed outwards from the metal part, the pieces of the mold may rip or otherwise damage the hook when these pieces are removed. Accordingly, in some embodiments, an additional machining step can be performed to create a hook in a metal part after the die cast molding. For example, a Computer Numerical Control (CNC) tool-cutter or other suitable tool can be used to cut the metal part after the die-cast molding to form a hook in the metal part.

Although creating a hook in a metal part through a CNC tool or through any other suitable machining step can be functional, it can have several disadvantages. For example, using a CNC tool requires an additional step to make the hook, which may cost extra time, resources, or both. As another example, due to the continual miniaturization of electronics (e.g., cellular phones becoming smaller in size, laptops becoming smaller in size, cameras becoming smaller in size, and other electronics becoming smaller in size), metal parts used in these electronics are increasingly smaller in size. As these metal parts become smaller in size, CNC tools or other such tools may improperly cut the metal part or otherwise be unable to meet the high precision required to machine these small parts. Indeed, due to the smallness and precision of these metal parts, creating features such as hooks can be very difficult or even impossible through techniques such as CNC tool machining.

SUMMARY OF THE DISCLOSURE

This is directed to systems and methods for insert-molding.

In some embodiments, to form a hook area in a metal part, a piece of "die steel" from a die-cast mold may be passed directly through the metal part. As used herein, the term "die steel" refers to at least a portion of the die-cast mold. This can be an efficient way of forming such an undercut since, for example, it can form a hook in a single step, it may not rip or otherwise damage the hook when the die-cast mold is removed, and it can allow for the precise creation of a hook in small, metal parts. Creating a hook in a metal part in this manner may, however, result in a hole in the metal part beneath the hook area.

In some embodiments, a plastic piece may be created adjacent to the metal part that includes the hook. For example, the plastic piece may be created through insert-molding plastic material over at least a portion of the metal part. In insert-molding, a plastic material (e.g., a thermoplastic, a thermosetting plastic, or any other suitable plastic material) can be heated, and then allowed to flow over a particular item or into a mold. The plastic material can then be allowed to cool and harden. As mentioned above, however, the metal part may include a hole beneath the hook area. In some embodiments, this hole may allow the plastic material to flow into the interior of the metal part during the insert-molding.

In some embodiments, the plastic material can be prevented from flowing through the hole (e.g., and into the interior of the metal part) during the insert-molding. For example, a piece of "tape" or other suitable material can be coupled over the hole. As another example, a wedge can be press-fit into the hole. As yet another example, a plug can be used to prevent the plastic material from flowing through the hole. In some embodiments, this plug can be removed after the insert-molding.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE DISCLOSURE

Figure 1A:
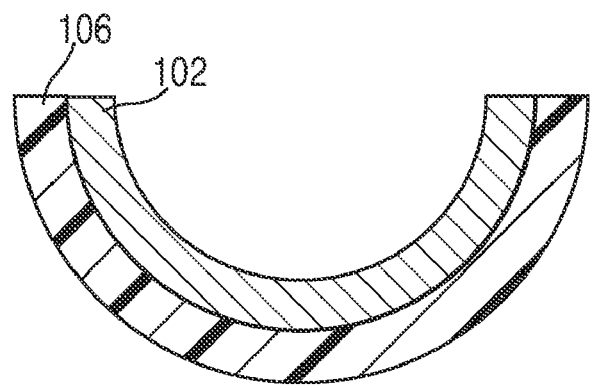
FIG. 1 is an illustrative metal part that may be created by die-casting and a plastic material that may be insert-molded in accordance with some embodiments of the invention.
Figure 1B:
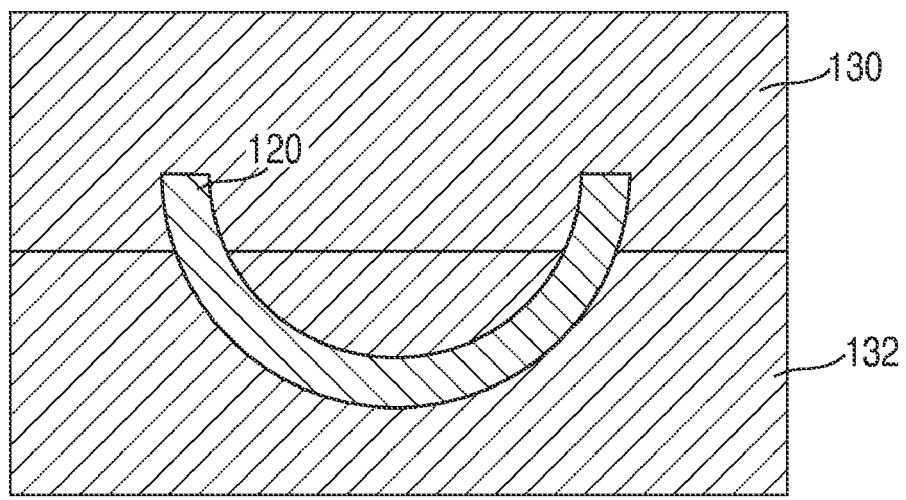

FIG. 1A shows a simplified schematic of metal part 102 that may be created by, for example, die-casting. In die-casting, a molten metal may be injected into a die-cast mold of a particular shape. For example, as shown in FIG. 1B, molten metal 120 can be injected into a die cast mold including mold piece 130 and mold piece 132. After molten metal 120 has solidified, the die-cast mold may be removed from the resulting metal part 102 by removing mold pieces 130 and 132 outwards. Metal part 102 may include any metal that is suitable for die-casting, such as, for example, zinc, copper, aluminum, magnesium, lead, tin based alloys, or any other suitable metal.

In this manner, die-casting can be used to make metal parts. Moreover, die-casting can include many benefits such as creating metal parts that are consistent, that have precise details, and that have good surface quality. Die-casting may even create metal parts with good qualities such as these when the metal parts are significantly small in size. Furthermore, as electronic devices become increasingly smaller in size (e.g., as cellular phones become smaller in size, as laptops become smaller in size, and the like), the requirement for small metal parts with high precision features can become greater.

In some embodiments, after metal part 102 has been die-cast, a de-flashing process may be performed in order to remove "flash" that is remaining on metal part 102. For example, flash may be created by excess molten metal that has leaked between the two surfaces of a mold (e.g., between mold piece 130 and mold piece 132) during the die-casting process.

After metal part 102 has been created (e.g., via die-casting), metal part 102 may be covered with plastic material 106. Plastic material 106 may, for example, improve the aesthetic appearance of, provide structural support for, provide protection for, or in any other way benefit metal part 102.

In some embodiments, plastic material 106 may be adhered to metal part 102 by using an adhesive (e.g., glue or other suitable adhesive) to couple plastic material 106 to metal part 102. For example, plastic material 106 can be separately manufactured into a desired shape, and then subsequently coupled to metal part 102. However, coupling plastic material 106 in this manner may sometimes cause errors or be detrimental to metal part 102. For example, metal part 102 and plastic material 106 may be misaligned when they are attached. This defect may especially be apparent or have a high chance of occurring when metal part 102 and plastic material 106 are small in size and/or have small features (e.g., if this is a metal part being used in a small, electronic device). Additionally or alternatively, the adhesive itself may degrade over time, thus causing metal part 102 and plastic material 106 to separate.

To avoid the undesirable results that may occur from using an adhesive, in some embodiments plastic material 106 may be insert-molded over metal part 102. During insert-molding, the plastic can be heated to a high temperature and then injected over metal part 102. The heated plastic may then flow over metal part 102 and, after cooling, solidify into plastic material 106. As it solidifies, plastic material 106 can adhere at least partially to metal part 102. In addition to the natural adherence between plastic material 106 and metal part 102, metal part 102 can include one or more locking features to improve the connection between metal part 102 and plastic material 106. For example, during the insert-molding the heated plastic may flow into various structures of metal part 102 (e.g., indentations or hooks) such that, after the plastic has solidified, plastic material 106 has effectively been locked to metal part 102.

Figure 2:
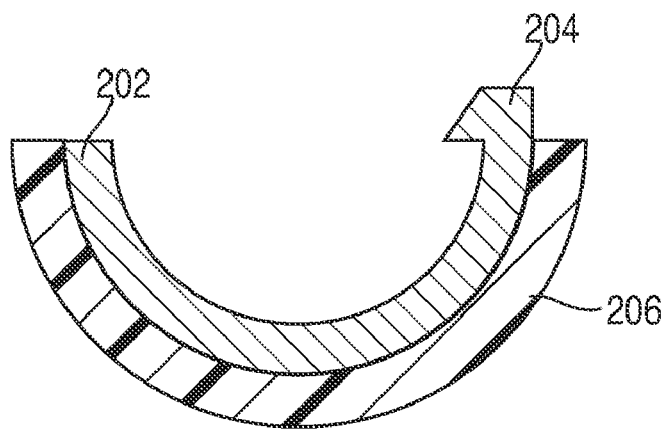
FIG. 2 is an illustrative system of an insert-molded plastic material that is placed over a metal part with a hook in accordance with some embodiments of the invention.

In some embodiments, a metal part can include a hook. For example, FIG. 2 shows metal part 202 that may include hook 204. Plastic material 206 can be coupled to metal part 202. Techniques for creating hook 204 in metal part 202 will be discussed in greater detail in the discussion to follow. Hook 204 may be used, for example, to latch metal part 202 to another suitable part such as, for example, a user-pressable button, another part in an electronic device or assembly, or any other suitable part. In this manner, hook 204 may provide a locking mechanism for attaching various parts of an assembly together.

Figure 3:
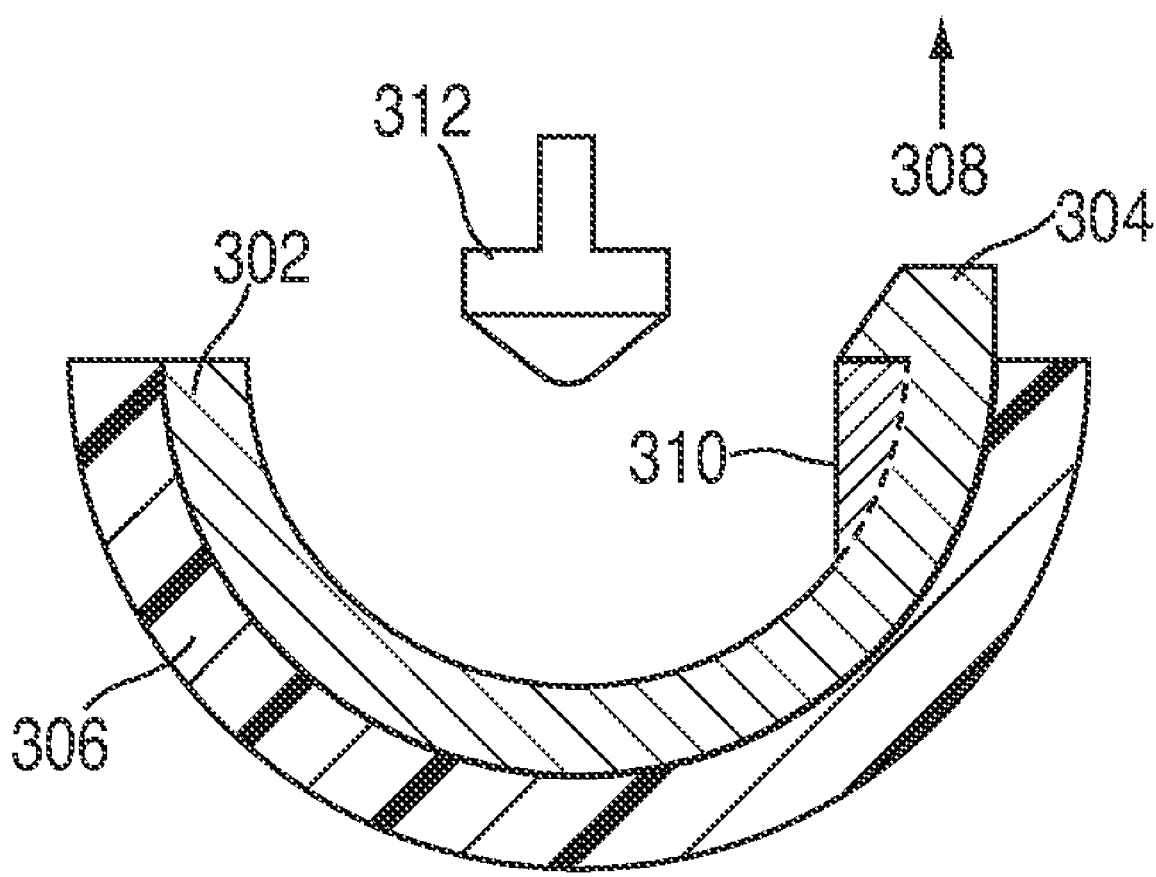
FIGS. 3 and 4 are illustrative systems for creating a hook in a metal part in accordance with some embodiments of the invention.

FIG. 3 is an illustrative system for one way of creating hook 304 in metal part 302. Metal part 302, hook 304, and plastic material 306 may correspond to, for example, metal part 202, hook 204, and plastic material 206 of FIG. 2. As mentioned above, metal part 302 may be created by die-casting the metal in a die-cast mold. However, this process alone may be insufficient to create hook 304. For example, after metal part 302 is formed by die-casting, the die-cast mold can be removed outwards from the metal part. For example, the die steel of the die-cast mold can be removed outwards in direction 308. In this case, die steel cannot be present in the area beneath hook 304 (e.g., the area including metal material 310). If die steel were present in this area beneath hook 304, hook 304 could be ripped or otherwise damaged by the die steel as the die-cast mold is removed. In some cases, it may even be impossible to remove the die-cast mold (e.g., since the die-cast mold may become "locked" to metal part 302 through hook 304).

Accordingly, in some embodiments an additional machining step can be performed after the die-casting to create hook 304. For example, after the molten metal has hardened and the die-cast mold has been removed, there may still be metal material 310 beneath hook 304. Hook 304 may then be formed by removing metal material 310 after metal part 302 has been die-cast. For example, metal material 310 may be selectively removed through a tool such as Computer Numerical Control (CNC) tool-cutter 312, or removed through any other appropriate machining or manufacturing process. However, although creating a hook in a metal part in this manner can be functional, it can require an extra machining step, extra time, extra resources, or any combination of the above. Furthermore, this technique may be unable to sufficiently form hooks and other fine features in small metal parts. For example, small metal parts are often used in electronic devices such as cellular phones, personal data assistants ("PDA's") or other electronic devices. These small metal parts may have fine or miniature features. A tool such as a CNC may not have the required amount of precision or have a small enough degree of error to sufficiently create these small metal parts.

Figure 4:
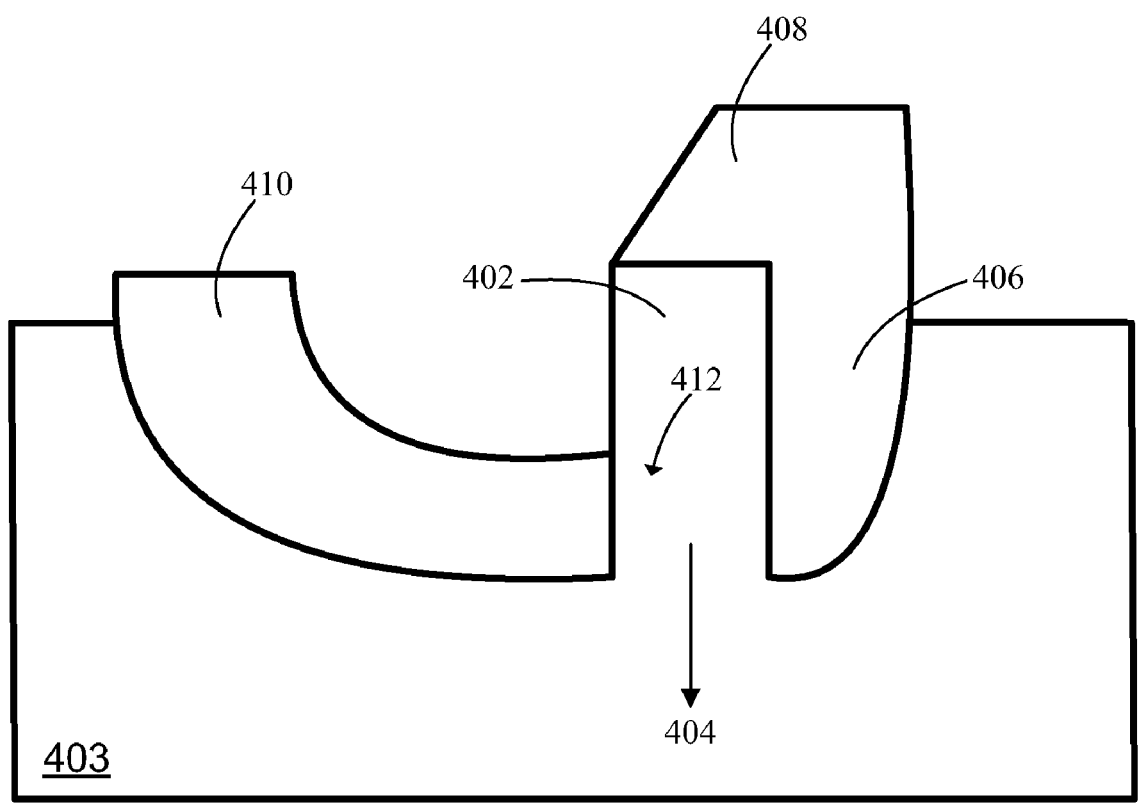

Accordingly, in some embodiments, more effective and efficient ways of creating hook 304 may be realized by passing the die steel of the die-cast mold directly through metal part 302. For example, FIG. 4 illustrates system 400 where die steel 402 of die-cast mold 403 can be "passed" through a metal part (although not pictured in FIG. 4 for the sake of simplicity, one skilled in the art could appreciate that mold 403 can include a suitable top mold piece, for example, similar to mold piece 130 of FIG. 1B, that is complementary to mold 403). In other words, after the molten metal has been injected into mold 403 and has hardened, die steel 402 can remain passed through the hardened, metal part. In particular, after the molten metal has hardened, this technique may result in section 406 that includes hook 408 and a separate section 410 (e.g., where section 410 can be coupled to section 406 around the periphery of die steel 402, and where section 406 and section 410 may together make up the metal part). Mold 403 may then be removed from sections 410 and 406 by removing outwardly in direction 404. In this manner, hooks can be formed in a metal part through a single, die-casting step.

Moreover, as the system illustrated by system 400 can benefit from the high precision of die-casting, small metal parts can be readily created with precise and accurate features such as miniature hooks.

Accordingly, since the system 400 can create hook 408 without a subsequent tooling step and instead utilizes die-casting to form this hook, this may be a valuable time efficient, cost efficient, and/or precise way of creating hook 408 in a metal part. For example, since a die-cast mold can create extremely fine and precise features, this technique can create hooks or other such features in metal parts with a high degree of accuracy and precision, even when the metal parts are small in size. As an illustration, this technique can accurately create hooks and features in small metal parts such as buttons, switches, and other parts of electronic devices. For example, a metal part with hooks and other features can be accurately formed that has a volume of 240 millimeters cubed (e.g., with dimensions of 3×4×20 millimeters, or any other suitable dimensions), a volume of 100 millimeters cubed (e.g., with dimensions of 2×5×10 millimeters, or any other suitable dimensions), a volume of 9 millimeters cubed (e.g., with dimensions of 3×3×1 millimeters, or any other suitable dimensions), or from any other suitable small, metal part. However, after die steel 402 has been removed (e.g., in direction 404), hole 412 may exist between section 406 and section 410 of the metal part.

As mentioned above, insert-molding can be a beneficial way of affixing a plastic material to a metal part. Additionally, passing die steel through a metal part can be an efficient way of creating a hook in this metal part. However, as shown in FIG. 4, if die steel 402 is passed through the metal part to create hook 408, this may create hole 412 in the area beneath hook 408. Accordingly, when insert-molding of plastic material is subsequently performed after the die-casting of the metal part, the hot plastic may flow through hole 412 and into the metal part (e.g., thus potentially deterring one from performing insert-molding after forming a hook as illustrated by system 400). In some cases, this may even result in preventing the use of insert-molding of a plastic material after creating a hook in the manner illustrated by FIG. 4.

Figure 5:
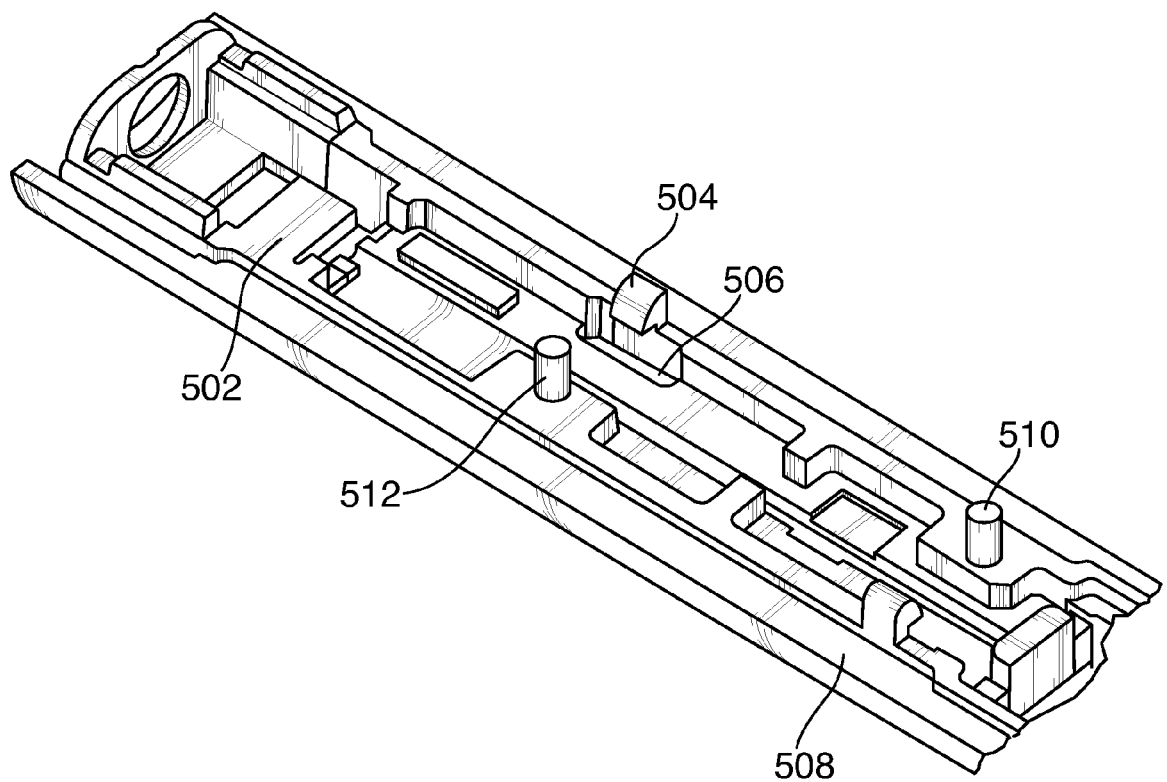
FIG. 5 is an illustrative system for insert-molding plastic material over a metal part with a hook in accordance with some embodiments of the invention.

For example, as illustrated in FIG. 5, metal part 502 may be created with hook 504. If hook 504 was created by passing die steel through metal part 502, there may be a resultant hole 506 beneath hook 504. Thus, when plastic material 508 is insert-molded against metal part 502, the plastic material may flow through hole 506 and into metal part 502. In some embodiments, during insert-molding, plastic may be prevented from flowing through holes in a metal part by passing tool steel into these holes from the inner side of metal part 502 (e.g., the side against which plastic material 508 is not placed in contact). As used herein, the term "tool steel" can refer to at least a portion of a tool used during the insert-molding process such as, for example, a portion of a mold for the insert-molding, a portion of a tool used to clamp the metal part in place during the insert molding, and the like. However, due to hook 504, the tool steel can be blocked from entering hole 506 (e.g., from the top direction). Thus, traditional methods such as tool steel may not be able to prevent plastic material from flowing through hole 506. Rather, alternative methods can be used for preventing the plastic from flowing through hole 506.

Figure 6:
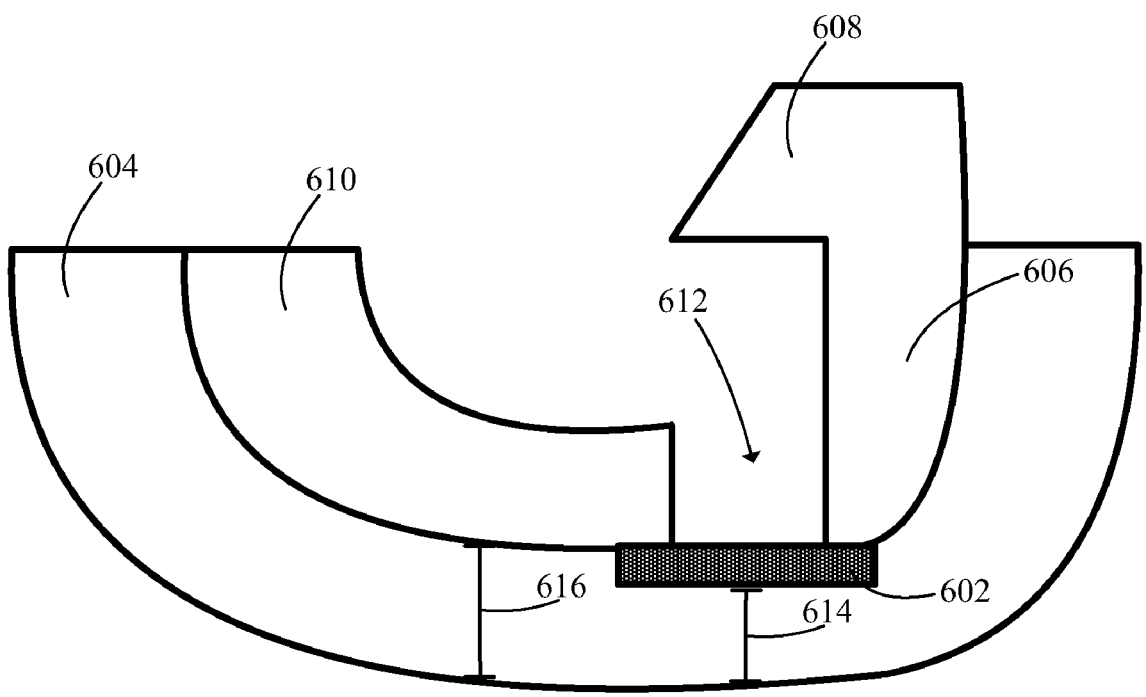
FIG. 6 is an illustrative system for using a tape material to prevent plastic material from flowing through a hole of a metal part in accordance with some embodiments of the invention.

FIG. 6 shows illustrative system 600 for preventing plastic material from flowing through a hole in a metal part during insert-molding of the plastic material. Section 606, hook 608, section 610, and hole 612 may, for example, correspond to section 406, hook 408, section 410, and hole 412 of FIG. 4, respectively. Section 606 and section 610 may, for example, be coupled together around the periphery of hole 612 and together can make up the metal part. To prevent plastic from entering through hole 612, in some embodiments tape material 602 may be coupled over hole 612. Tape material 602 can, for example, be coupled over hole 612 after the metal part has been die-casted and removed from the die-cast mold and before plastic material 604 has been insert-molded. In this manner, when plastic material 604 is insert-molded over the metal part, plastic material 604 may be prevented from entering hole 612 by tape material 602.

Tape material 602 can include any material that can sufficiently adhere to sections 606 and 610 during the insert-molding process. For example, tape material 602 can include Mylar, Polyethylene terephthalate (PET), thin sheets of plastic, or any other suitable material. In some embodiments, tape material 602 can remain in place after plastic material 604 has been insert-molded and can become a permanent fixture between plastic material 604 and sections 606 and 610. In this case, as illustrated by FIG. 6, the presence of tape material 602 may reduce the relative thickness of plastic material 604. For example, width 614 of plastic material 604 (where tape material 602 is located) may be smaller than width 616 (where tape material 602 is not located). Accordingly, it may be beneficial to choose a tape material 602 that is substantially thin in order to allow plastic material 604 to be as thick as possible. Doing so may, for example, reduce the risk of blemishes on the exterior surface of plastic material 604.

Figure 7:
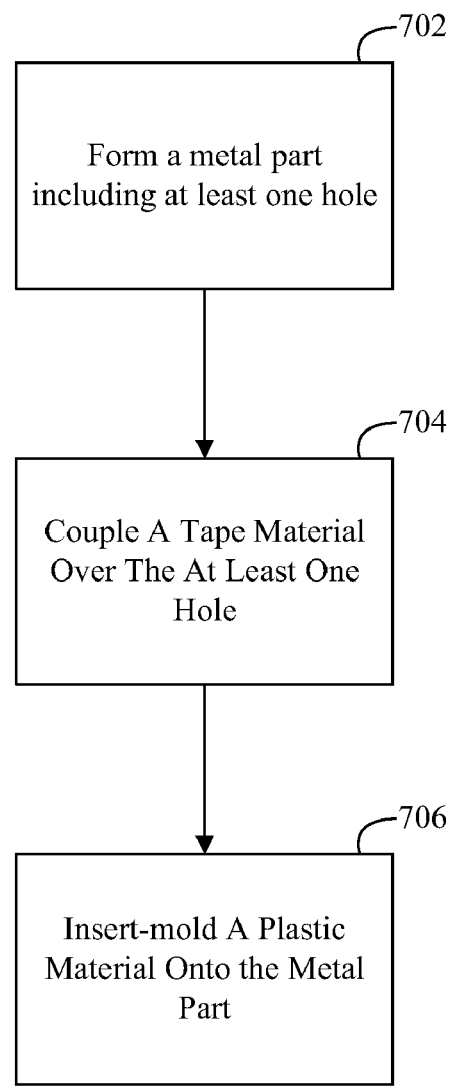
FIG. 7 is an illustrative flowchart for using a tape material to prevent plastic material from flowing through a hole in a metal part in accordance with some embodiments of the invention.

FIG. 7 shows illustrative process 700 for using a tape material to prevent plastic material from flowing through a hole in a metal part. At step 702, a metal part including at least one hole can be formed. For example, the metal part can be formed via die-cast molding. As another example, the hole can be positioned beneath a hook feature of the metal part, where the hook and hole can be formed by passing die-steel of the die-cast mold through the metal part during the die-casting. For example, the metal part can include a hook such as hook 608 of FIG. 6.

At step 704, a tape material (e.g., tape material 602 of FIG. 6) can be coupled over the at least one hole. The tape material can include, for example, Mylar, Polyethylene terephthalate (PET), thin sheets of plastic, or any other material suitable to adhere to the metal part and cover the at least one hole. In some embodiments, one piece of tape material can be used to cover the at least one hole. For example, when two or more holes are included in the metal part, one piece of tape material can be used to cover all of these holes. In some embodiments, multiple pieces of tape material can be used to cover the at least one hole. For example, three pieces of tape material can be used to cover three holes, two pieces of tape material can be used to cover three holes (e.g., where one piece of tape material may cover two holes), two pieces of tape material can both used to cover one hole, or any other suitable number of pieces of tape material can be used.

At step 706, a plastic material, such as plastic material 604 of FIG. 6, can be insert-molded over at least a portion of the metal part. During step 706, the tape material can prevent the plastic material from flowing through the at least one hole (e.g., and into the metal part) during the insert-molding.

Figure 8:
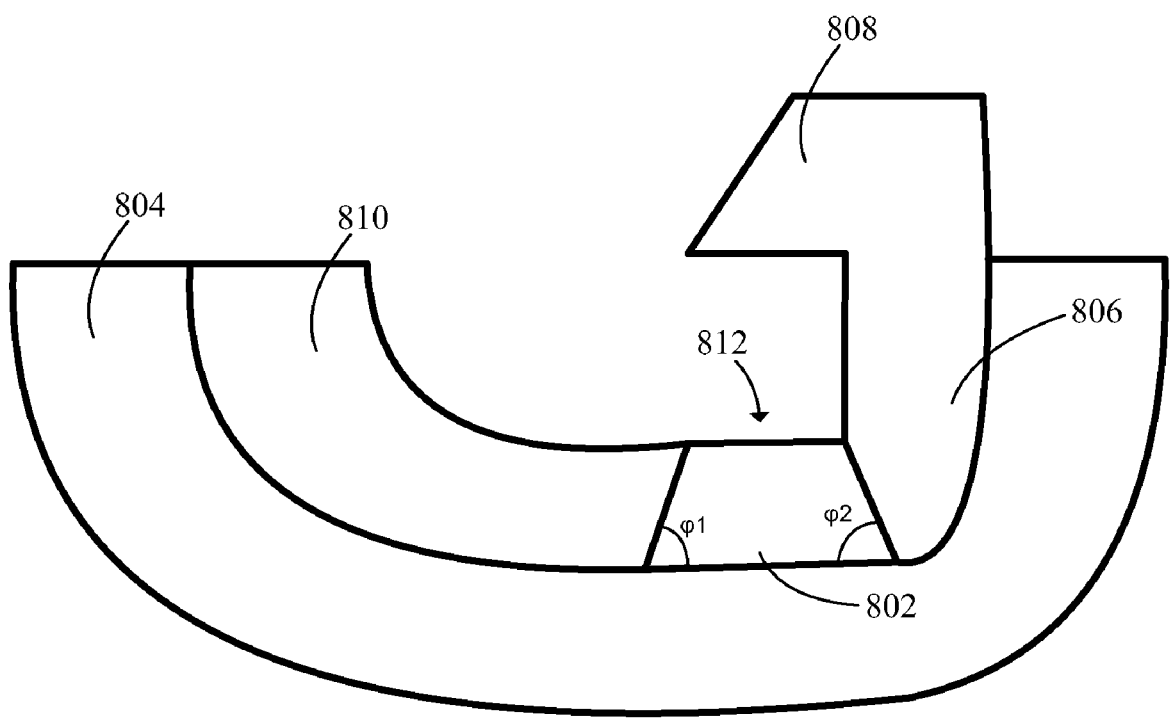
FIGS. 8 and 9 are illustrative systems for using a press-fit metal wedge to prevent plastic material from flowing through a hole of a metal part in accordance with some embodiments of the invention.

FIG. 8 shows illustrative system 800 for preventing plastic material from flowing through a hole in a metal part during insert-molding of the plastic material. Similar to system 600 of FIG. 6, section 806, hook 808, section 810, and hole 812 may, for example, correspond to section 406, hook 408, section 410, and hole 412 of FIG. 4, respectively. Section 806 and section 810 may, for example, be coupled together around the periphery of hole 812 and together can make up the metal part.

As illustrated by FIG. 8, wedge 802 may be press-fit into hole 812 after the metal part has been die-cast and before plastic material 804 has been insert-molded onto the metal part. Although wedge 802 is illustrated in FIG. 8 as being insertable from the bottom side of the metal part (e.g., from the side of the metal part adjacent to plastic material 804), one skilled in the art could appreciate that wedge 802 could alternatively or additionally be press-fit from the top of the metal part or from any other suitable direction.

In order to press-fit two metal pieces (e.g., the wedge and the metal part) together, the two pieces can be pushed against one another and the resulting static friction may then hold these pieces together. Additionally, the forces holding these press-fit metal pieces together may be greatly increased by compressing one metal piece against the other. Thus, it may be beneficial to use softer metals during the press-fitting in order to increase the compression between these metal pieces. Accordingly, wedge 802 can include any metal suitable for press-fitting such as, for example, zinc. As zinc is a softer metal, it may readily compress and thus increase the forces holding wedge 802 within hole 812. In some embodiments, the metal part and wedge 802 can be made from the same type of metal. For example, when section 806, section 810, and wedge 802 are all made of zinc (e.g., or all made of the same type of any suitable metal), corrosion or other undesirable chemical reactions may be prevented from occurring where wedge 802 contacts section 810 and 806 of the metal part.

Wedge 802 may additionally be fabricated with draft angle $\varnothing_1$ and draft angle $\varnothing_2$. Draft angle $\varnothing_1$ and draft angle $\varnothing_2$ may typically be chosen to allow for a generous slope in the sides of wedge 802 (e.g., 2 degrees, 3 degrees, or any other suitable angle of slope). Draft angle $\varnothing_1$ and draft angle $\varnothing_2$ may both be the same degree or may be different degrees. This slope may, for example, beneficially allow wedge 802 to slide more smoothly into hole 812, help mitigate errors between the size of wedge 802 and hole 812, and allow wedge 802 to be press-fit with a smaller amount of force.

In some embodiments, a part operative to move up and down (e.g., or move in any other suitable direction) during its use may be placed over hook 808. As one illustration, a part incorporated by a user-pressable button may be latched over hook 808. During use, the user-pressable button (e.g., and the part incorporated by the button that is latched over hook 808) may move up and down. Thus, in some embodiments, it may be beneficial to have a gap in wedge 802 in order to allow a part placed over hook 808 sufficient leeway to move up and down.

Figure 9:
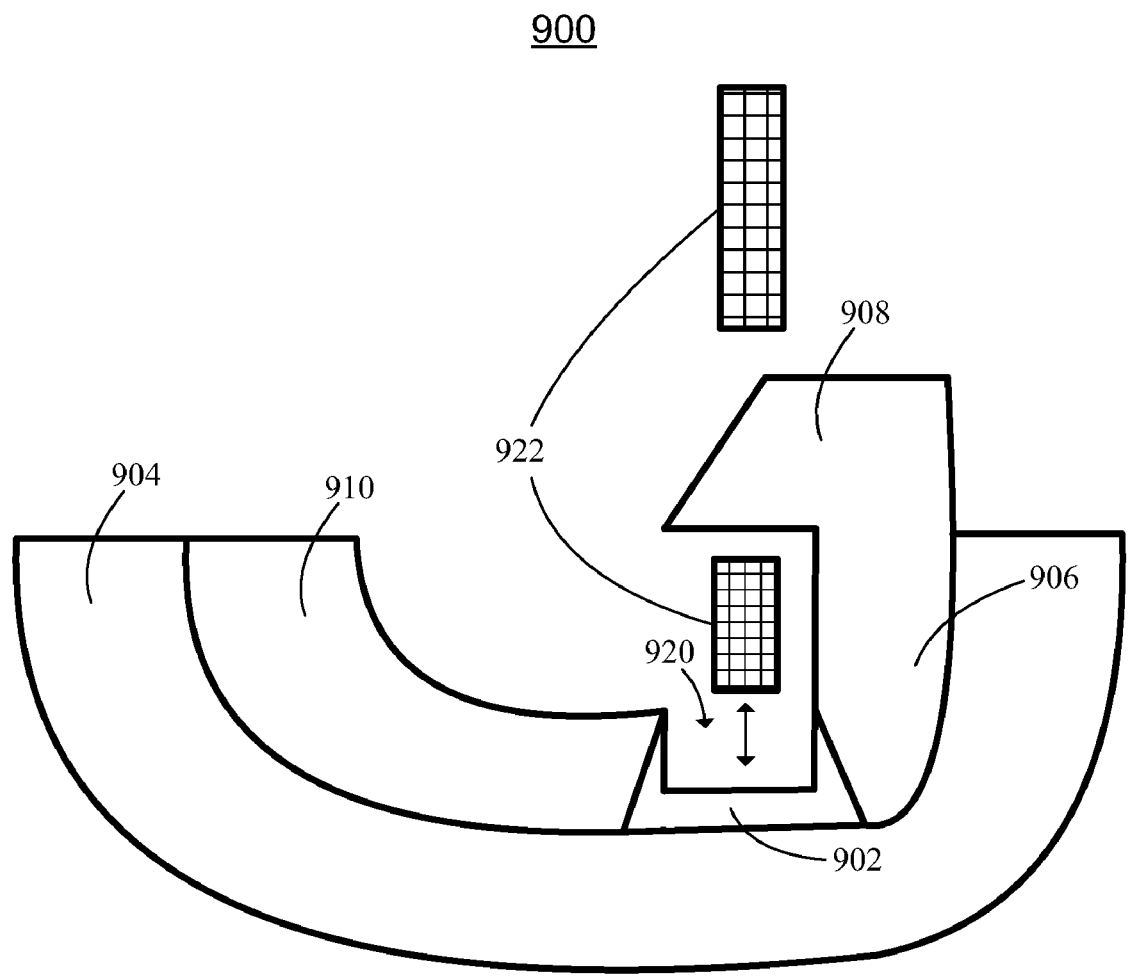

As an example, FIG. 9 illustrates wedge 902 that can include gap 920. In FIG. 9, plastic material 904, section 906, hook 908, and section 910 may, for example, correspond to plastic material 804, section 806, hook 808, and section 810 of FIG. 8, respectively. Moreover, part 922 can be placed over hook 908. Part 922 can include, for example, a user-pressable button or any other suitable part that can move during operation. As can be seen from FIG. 9, gap 920 can allow part 922 leeway to move up and down (e.g., or move in any other suitable direction) around hook 908.

Figure 10:
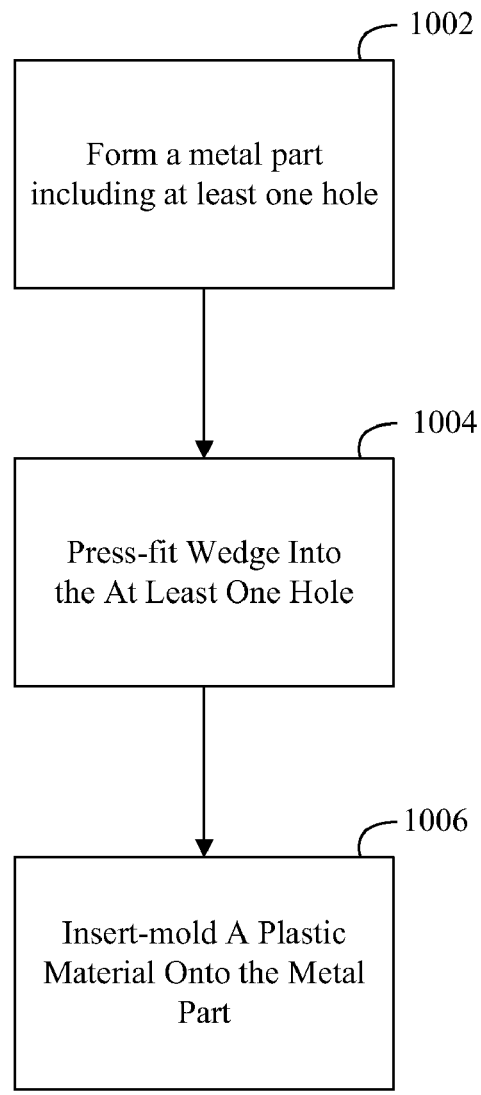
FIG. 10 is an illustrative flowchart for using a wedge to prevent plastic material from flowing through a hole in a metal part in accordance with some embodiments of the invention.

FIG. 10 shows illustrative process 1000 for using a wedge to prevent plastic material from flowing through a hole in a metal part. At step 1002, a metal part including at least one hole can be formed. For example, the metal part can be formed via die-cast molding. As another example, the hole can be positioned beneath a hook feature of the metal part, where the hook and hole can be formed by passing die-steel of the die-cast mold through the metal part during the die-casting. For example, the metal part can include a hook such as hook 808 of FIG. 8.

At step 1004, a wedge such as wedge 802 of FIG. 8 can be press-fit into the at least one hole. Generally, a single wedge can be press fit into each hole of the metal part. For example, one wedge can be used when the metal part includes one hole, two wedges can be used when the metal includes two holes, and so forth. However, one skilled in the art could appreciate that any suitable number of wedges could alternatively be used for any suitable number of holes (e.g., two wedges may be placed into a single hole, and the like).

The wedge can include any suitable material such as zinc, a soft metal, or any other suitable metal. In some embodiments, the wedge can include draft angle $\varnothing_1$ and draft angle $\varnothing_2$ that may be any suitable angle. For example, draft angle $\varnothing_1$ and draft angle $\varnothing_2$ may be 2 degrees, three degrees, or any other suitable angle. Moreover, draft angle $\varnothing_1$ and draft angle $\varnothing_2$ may each be the same angle or may be different angles. In some embodiments, the wedge can include a gap, such as gap 920 of FIG. 9. The gap may, for example, allow a part coupled over a hook of the metal part to move.

At step 1006, a plastic material, such as plastic material 804 of FIG. 8, can be insert-molded over at least a portion of the metal part. During step 1006, the wedge can prevent the plastic material from flowing through the at least one hole (e.g., and into the metal part) during the insert-molding.

Figure 11:
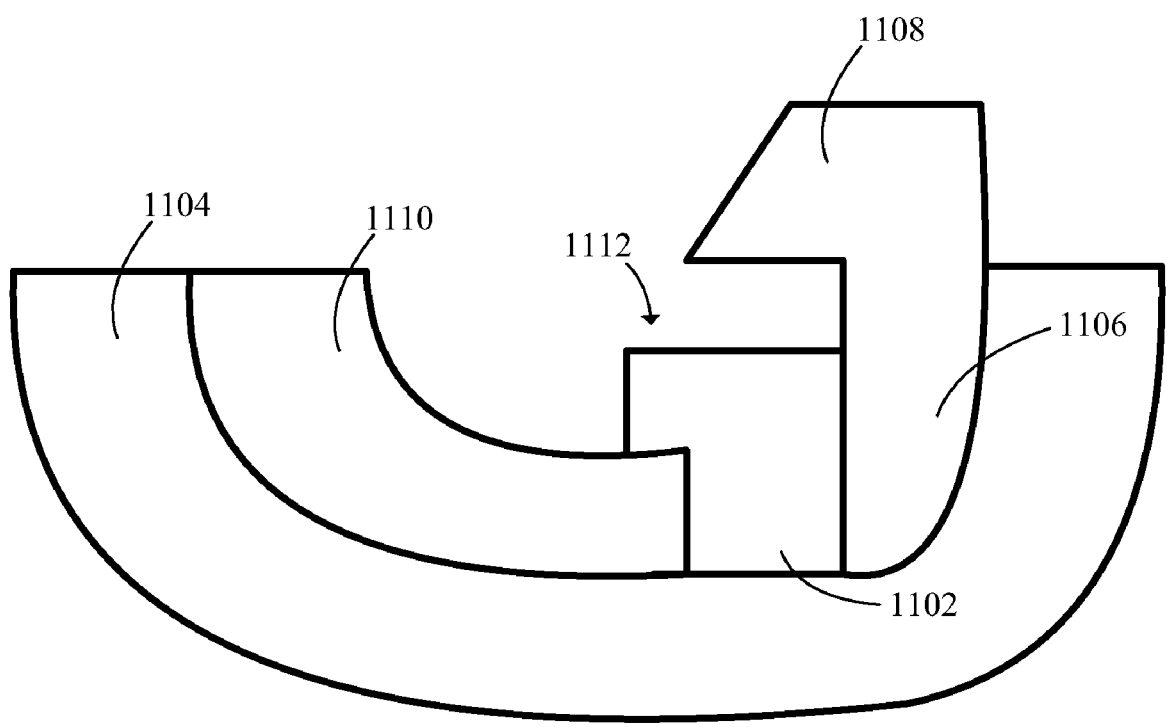
FIG. 11 is an illustrative system for using a plug to prevent plastic material from flowing through a hole of a metal part in accordance with some embodiments of the invention.

FIG. 11 shows illustrative system 1100 for preventing plastic material from flowing through a hole in a metal part during insert-molding of the plastic material. Similar to system 600 of FIG. 6, section 1106, hook 1108, section 1110, and hole 1112 may, for example, correspond to section 406, hook 408, section 410, and hole 412 of FIG. 4, respectively. Section 1106 and section 1110 may, for example, be coupled together around the periphery of hole 1112 and together can make up the metal part.

As illustrated in FIG. 11, after die-casting the metal part, plug 1102 may be inserted into hole 1112 to prevent plastic from flowing through hole 1112 during insert-molding. Although plug 1102 is illustrated in FIG. 11 as being insertable from the top side of the metal part (e.g., from the side of the metal part not adjacent to plastic material 1104), one skilled in the art could appreciate that plug 1102 could alternatively or additionally be inserted from the bottom of the metal part or from any other suitable direction.

In some embodiments, tool steel can be used to secure plug 1102 in place during the insert-molding. For example, tool steel of a mold used during the insert-molding can be pressed against plug 1102 to hold plug 1102 in hole 1112. In some embodiments, plug 1102 can securely remain in place on its own during the insert-molding (e.g., the friction between plug 1102 and sections 1106 and 1110 may sufficiently secure plug 1102 into hole 1112).

In some embodiments, after the insert-molding has completed and plastic material 1104 has sufficiently hardened, plug 1102 may be removed from hole 1112. Removing plug 1102 in this manner may allow a part (e.g., a user-pressable button) that has been placed over hook 1108 sufficient leeway to move up and down into hole 1112 (e.g., as described in connection with FIG. 9). Moreover, removing plug 1102 can eliminate the possibility of plug 1102 subsequently becoming loose and falling into the metal part.

Plug 1102 may be created from any material that may suitably block hole 1112 and withstand the high temperatures of the insert-molding process. As one example, a softer metal such as silicon may be used.

Figure 12:
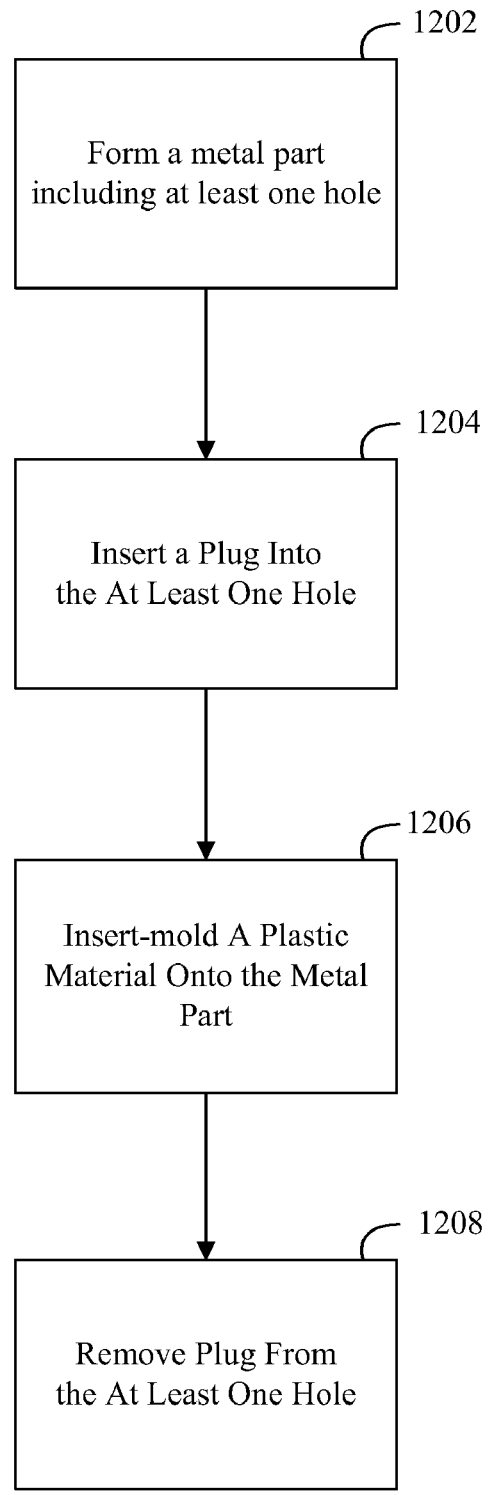
FIG. 12 is an illustrative flowchart for using a plug to prevent plastic material from flowing through a hole in a metal part in accordance with some embodiments of the invention.

FIG. 12 shows illustrative process 1200 for using a plug to prevent plastic material from flowing through a hole in a metal part. At step 1202, a metal part including at least one hole can be formed. For example, the metal part can be formed via die-cast molding. As another example, the hole can be positioned beneath a hook feature of the metal part, where the hook and hole can be formed by passing die-steel of the die-cast mold through the metal part during the die-casting. For example, the metal part can include a hook such as hook 1108 of FIG. 11.

At step 1204, a plug, such as plug 1102 of FIG. 11, can be inserted into the at least one hole. Generally, a single plug can be inserted into each hole of the metal part. For example, one plug can be used when the metal part includes one hole, two plugs can be used when the metal includes two holes, and so forth. However, one skilled in the art could appreciate that any suitable number of plugs could alternatively be used for any suitable number of holes (e.g., two plugs may be placed into a single hole, and the like).

At step 1206, a plastic material, such as plastic material 1104 of FIG. 11, can be insert-molded over at least a portion of the metal part. During step 1206, the plug can prevent the plastic material from flowing through the at least one hole (e.g., and into the metal part) during the insert-molding.

At step 1208, the plug can be removed from the at least one hole. For example, removing the plug can provide additional room for a part (e.g., coupled over a hook of the metal part) to move. Additionally or alternatively, removing the plug can eliminate the possibility of the plug loosening and subsequently falling out of the hole.

The processes discussed above are intended to be illustrative and not limiting. Persons skilled in the art could appreciate that steps of the processes discussed herein can be omitted, modified, combined, or rearranged, and any additional steps can be performed without departing from the scope of the invention. For example, in some embodiments, step 1208 of process 1200 can optionally be omitted and the plug may remain in the hole of the metal part.

In some embodiments, a metal part that has been die cast may also be created with a small projection (e.g., a boss). For example, metal part 502 of FIG. 5 may contain boss 510 and boss 512. To join two parts together, the head of a boss may be deformed to create a retention head that then holds these two parts together. As one example, boss 510 and boss 512 may be used to join metal part 502 to a printed circuit board.

In some embodiments, the boss can be made from plastic. In this case, a process known as thermal staking may be used to create the retention head. In thermal staking, the boss can be heated to soften the plastic and pressure can then be applied from above, thus deforming the top of the boss into the retention head. In some embodiments, however, the boss can be made from metal (e.g., metal boss 510 and metal boss 512 of FIG. 5). In this case, thermal staking may not be an appropriate approach.

Figure 13A:
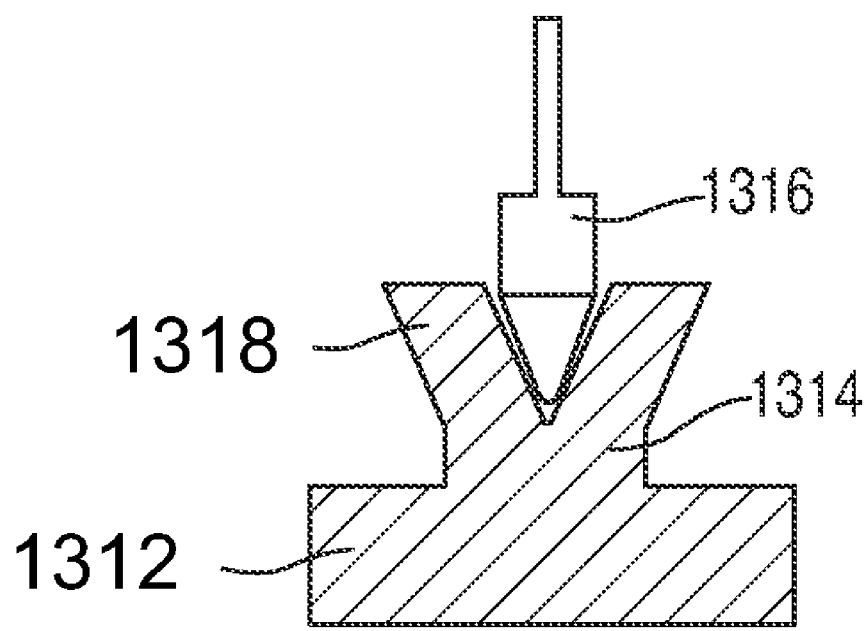
FIGS. 13A and 13B are illustrative systems for a metal part with a metal boss in accordance with some embodiments of the invention.

Accordingly, in some embodiments, a metal boss can be deformed through swaging. During a swaging process, a swage tool can be applied to the boss to plastically deform the boss and create a retention head. For example, as illustrated in FIG. 13A, metal part 1312 can include metal boss 1314. Swage tool 1316 may be pressed into metal boss 1314, thus deforming and bending metal boss 1314. As it deforms, the head of metal boss 1314 may cave outwards to create head 1318, thus affixing metal part 1312 to another part (e.g., retaining a printed circuit board placed around boss 1314 between metal part 1312 and head 1318). The amount of force necessary to deform the boss and form a retention head, however, may be substantial. Moreover, there may be a risk of cracking or fracturing other components adjacent to the boss (e.g., a circuit board retained by the boss).

Figure 13B:
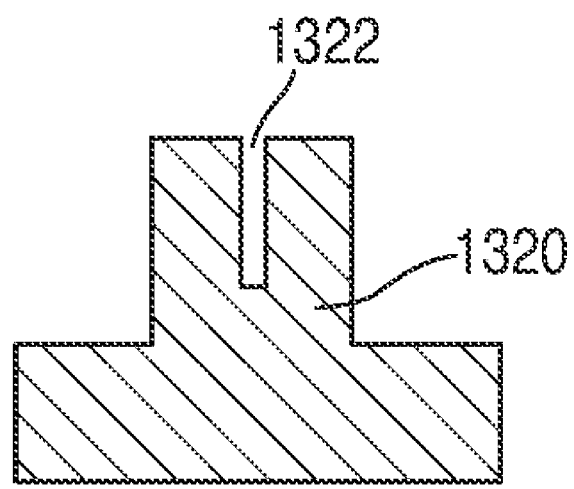

To reduce the amount of force used for the swaging process, in some embodiments a hole may first be drilled into the metal boss. For example, FIG. 13B shows metal boss 1320 with hole 1322 drilled along the boss axis. Because hole 1322 may reduce the axial strength of boss 1320, hole 1322 may beneficially allow the swaging process to be performed with a smaller amount of force. Additionally, the swaging process can provide a greater amount of retention since the retention head may cave outwards by a larger amount than if, for example, hole 1322 were absent.

It will be apparent to those of ordinary skill in the art that methods involved in the invention may be embodied in a computer program product that includes a machine readable and/or usable medium. For example, such a computer usable medium may consist of a read-only memory device, such as a CD ROM disk or conventional ROM device, or a random access memory, such as a hard drive device or a computer diskette, or flash memory device having a computer readable program code stored thereon.

The above-described embodiments of the invention are presented for purposes of illustration and not of limitation.

What is claimed is:

1. A method comprising:
   injecting molten metal into a die-cast mold;
   allowing the molten metal to harden to form a metal piece;
   passing die steel of the die-cast mold through the molten metal during the injecting;
   removing the metal piece from the die-cast mold, wherein the metal piece comprises a hook;
   press-fitting a wedge into a hole passing through the metal piece, wherein the hole is formed as a result of the passing of the die steel; and
   insert-molding a plastic material onto at least a portion of the metal piece, wherein the wedge prevents the plastic material from passing through the hole during the insert-molding and a gap in the wedge allows an external part that is coupled over the hook to move at least one of towards the hole and away from the hole.

2. The method of claim 1, wherein the hook is formed via the passing of the die steel through the molten metal during the injecting.

3. A method comprising:
   injecting molten metal into a die-cast mold;
   allowing the molten metal to harden to form a metal piece, wherein the metal piece comprises a hole passing through it and wherein the hole was formed by passing die steel of the die-cast mold through the molten metal during the injecting;
   removing the metal piece from the die-cast mold;
   press-fitting a wedge into the hole;
   insert-molding a plastic material onto at least a portion of the metal piece, wherein the wedge prevents the plastic material from passing through the hole during the insert-molding, and wherein the metal piece further comprises a hook formed via the passing of the die steel through the molten metal during the injecting; and coupling a moveable part over the hook, and wherein the wedge comprises a gap providing space for the moveable part to shift position.

4. A method comprising:

injecting molten metal into a die-cast mold;

allowing the molten metal to harden to form a metal piece, wherein the metal piece comprises a hole passing through it and wherein the hole was formed by passing die steel of the die-cast mold through the molten metal during the injecting;

removing the metal piece from the die-cast mold;

press-fitting a wedge into the hole; and insert-molding a plastic material onto at least a portion of the metal piece, wherein the wedge prevents the plastic material from passing through the hole during the insert-molding, and wherein the wedge comprises zinc.

5. A method comprising:

injecting molten metal into a die-cast mold;

allowing the molten metal to harden to form a metal piece, wherein the metal piece comprises a hole passing through it and wherein the hole was formed by passing die steel of the die-cast mold through the molten metal during the injecting;

removing the metal piece from the die-cast mold;

press-fitting a wedge into the hole; and insert-molding a plastic material onto at least a portion of the metal piece, wherein the wedge prevents the plastic material from passing through the hole during the insert-molding, and wherein the wedge comprises a draft angle of two degrees.

6. The method of claim 1, wherein the metal piece is formed from a first metal and the wedge is formed from a second metal, and wherein the second metal is softer than the first metal.

7. A method comprising:

die-casting a metal piece, wherein the metal piece includes a hole associated with a hook feature of the metal piece, and wherein the hole extends from a bottom surface of the metal piece to a top surface of the metal piece;

press-fitting a wedge having a gap into the hole such that the wedge occupies only a portion of the hole; and insert-molding a plastic material onto at least a portion of the metal piece, wherein the wedge prevents the plastic material from passing through the hole during the insert-molding.

8. The method of claim 7, wherein the hook feature is positioned above the hole.

9. The method of claim 7, wherein press-fitting the wedge into the hole comprises:

press-fitting the wedge from the bottom surface of the metal piece.

10. The method of claim 7, wherein press-fitting the wedge into the hole comprises:

press-fitting the wedge from the top surface of the metal piece.

11. The method of claim 7, wherein the plastic material comprises at least one of a thermoplastic and a thermosetting plastic.

12. The method of claim 7, wherein insert-molding the plastic material further comprises:

forming a protective barrier on the metal piece by insert-molding the plastic material onto the at least a portion of the metal piece.

13. A method comprising:

die-casting a metal piece, wherein the metal piece includes a hole extending from a bottom surface of the metal piece to a top surface of the metal piece;

press-fitting a wedge into the hole; and insert-molding a plastic material onto at least a portion of the metal piece, wherein the wedge prevents the plastic material from passing through the hole during the insert-molding, and wherein the metal piece comprises a volume less than 9 millimeters cubed.

14. The method of claim 7, wherein the die-casting comprises:

injecting a molten metal in a die-cast mold;

allowing the molten metal to harden into the metal piece; and removing the metal piece from the die-cast mold after the molten metal has hardened, wherein the hole is formed by passing die steel of the die-cast mold through the molten metal during the injecting of molten metal.

15. The method of claim 14, wherein the die-casting further comprises:

forming the hook feature in the metal piece via the passing of the die steel through the molten metal during the injecting of molten metal.

16. A method comprising:

injecting molten metal into a die-cast mold;

allowing the molten metal to harden to form a metal piece, wherein the metal piece comprises at least one hook;

passing die steel of the die-cast mold through the molten metal during the injecting;

removing the metal piece from the die-cast mold;

sealing a hole passing through the metal piece, wherein the hole is formed as a result of the passing of the die steel; and insert-molding a plastic material onto at least a portion of the metal piece, wherein the sealing prevents the plastic material from passing through the hole during the insert-molding and a gap in the sealing allows an external component that is coupled over the at least one hook to move within an area between the hook and the hole.

17. The method of claim 16, wherein the sealing includes sealing the hole with a wedge.

18. The method of claim 16, wherein the sealing includes sealing the hole with a plug.

* * * * *

UNITED STATES PATENT AND TRADEMARK OFFICE
CERTIFICATE OF CORRECTION

| | | |
|---|---|---|
| PATENT NO. | : 8,342,228 B2 | Page 1 of 1 |
| APPLICATION NO. | : 12/624886 | |
| DATED | : January 1, 2013 | |
| INVENTOR(S) | : Emery Sanford et al. | |

It is certified that error appears in the above-identified patent and that said Letters Patent is hereby corrected as shown below:

On the Title Page, Item number (75): Inventor "Ed Holman" should read -- Edward A. Holman II --.

Signed and Sealed this
Twenty-ninth Day of September, 2015

Michelle K. Lee
*Director of the United States Patent and Trademark Office*